(12) United States Patent
Hubrig et al.

(10) Patent No.: US 9,790,107 B2
(45) Date of Patent: Oct. 17, 2017

(54) APPARATUS AND METHOD FOR GENERATING METAL IONS IN A FLUID STREAM

(71) Applicant: Innovation Services, Inc., Knoxville, TN (US)

(72) Inventors: Jeffrey G. Hubrig, Knoxville, TN (US); Joseph B. Dooley, Kingston, TN (US)

(73) Assignee: INNOVATION SERVICES, INC., Knoxville, TN (US)

( * ) Notice: Subject to any disclaimer, the term of this patent is extended or adjusted under 35 U.S.C. 154(b) by 30 days.

(21) Appl. No.: 14/372,581

(22) PCT Filed: Oct. 31, 2012

(86) PCT No.: PCT/US2012/062640
§ 371 (c)(1),
(2) Date: Jul. 16, 2014

(87) PCT Pub. No.: WO2013/066907
PCT Pub. Date: May 10, 2013

(65) Prior Publication Data
US 2015/0090654 A1    Apr. 2, 2015

(51) Int. Cl.
*C25D 17/00* (2006.01)
*C25B 9/00* (2006.01)
(Continued)

(52) U.S. Cl.
CPC .......... *C02F 1/4608* (2013.01); *C02F 1/4606* (2013.01); *C02F 1/46109* (2013.01);
(Continued)

(58) Field of Classification Search
CPC .. C25B 9/00; C25B 15/02; C25B 9/04; C25B 1/00; C25B 9/06; C02F 1/469; B01D 61/44
(Continued)

(56) References Cited

U.S. PATENT DOCUMENTS 2,475,653 A * 7/1949 Washburn ............... H01J 49/14
250/424
2,767,135 A   10/1956 Juda et al.
(Continued)

*Primary Examiner* — Ana Fortuna
(74) *Attorney, Agent, or Firm* — Luedeka Neely Group PC

(57) ABSTRACT

An apparatus for providing metal ions to a fluid waste stream includes a housing having an inlet port and an outlet port through which the fluid waste stream enters and exits the housing. Within the housing and between the inlet and outlet ports is an electrode assembly that includes first electrode ring assemblies and second electrode ring assemblies. Each first electrode ring assembly includes a first tubular section formed of electrically insulative material and has an interior through which the fluid waste stream flows. One or more first electrode plates span the interior of the first tubular section and contact the fluid waste stream. Each second electrode ring assembly includes a second tubular section formed of electrically insulative material and has an interior through which the fluid waste stream flows. One or more second electrode plates span the interior of the second tubular section and contact the fluid waste stream. The first tubular sections of the first electrode ring assemblies are in fluid communication with the second tubular sections of the second electrode ring assemblies.

17 Claims, 4 Drawing Sheets

(51) Int. Cl.
*C25F 7/00* (2006.01)
*C02F 1/48* (2006.01)
*C02F 1/46* (2006.01)
*C02F 1/461* (2006.01)

(52) U.S. Cl.
CPC *C02F 2001/46133* (2013.01); *C02F 2201/46* (2013.01); *C02F 2209/005* (2013.01); *C02F 2303/04* (2013.01)

(58) Field of Classification Search
USPC .............................. 204/30, 225, 228.1, 228.2
See application file for complete search history.

(56) References Cited

U.S. PATENT DOCUMENTS

| | | |
|---|---|---|
| 4,384,943 A * | 5/1983 | Stoner ................ C02F 1/46104 205/744 |
| 4,525,272 A | 6/1985 | Henson |
| 5,068,778 A | 11/1991 | Kosem et al. |
| 5,302,273 A | 4/1994 | Kemmerer |
| 5,364,512 A | 11/1994 | Earl |
| 5,425,858 A | 6/1995 | Farmer |
| 6,126,820 A | 10/2000 | DeSanto |
| 6,972,077 B2 | 12/2005 | Tipton et al. |
| 7,622,025 B2 | 11/2009 | Polnicki et al. |
| 7,794,606 B2 * | 9/2010 | Dooley ................ A61L 11/00 205/756 |
| 7,799,234 B2 * | 9/2010 | Dooley ................ A61L 11/00 205/742 |
| 2009/0229981 A1 | 9/2009 | DeSanto |
| 2010/0051477 A1 * | 3/2010 | Jeon ................ C02F 1/4672 205/751 |
| 2012/0285459 A1 | 11/2012 | Sata et al. |
| 2013/0335869 A1 * | 12/2013 | Xepapas ................ H01C 8/04 361/56 |

* cited by examiner

APPARATUS AND METHOD FOR GENERATING METAL IONS IN A FLUID STREAM

FIELD

This invention relates to the field of water treatment and disinfection. More particularly, this invention relates to a module for generating metal ions in a waste water stream to kill bacteria and other infectious agents, and/or to destroy or promote the destruction of pharmaceutical components in the waste water stream, and/or provide metal ions for the catalytic ionization of oxygen in the oxidation process.

SUMMARY

Various embodiments of the present invention are directed to an apparatus for providing metal ions to a fluid waste stream. In some embodiments, the apparatus includes a housing having an inlet port through which the fluid waste stream enters the housing and an outlet port through which the fluid waste stream exits the housing. Disposed within the housing and between the inlet port and outlet port is an electrode assembly. The electrode assembly includes one or more first electrode assemblies and one or more second electrode assemblies.

Each first electrode assembly includes a first tubular section formed of electrically insulative material. The first tubular section has an interior through which flows the fluid waste stream. One or more first electrode plates, formed at least partially of a first metal, span the interior of the first tubular section and contact the fluid waste stream.

Each second electrode assembly includes a second tubular section formed of electrically insulative material and has an interior through which flows the fluid waste stream. One or more second electrode plates, formed at least partially of a second metal, span the interior of the second cylindrical section and contact the fluid waste stream. In a preferred embodiment, the interiors of the first tubular sections of the first electrode ring assemblies are in fluid communication with the interiors of the second tubular sections of the second electrode ring assemblies.

In some embodiments, the first electrode assemblies are interdigitated with the one or more second electrode assemblies.

In some embodiments, the first metal is copper and the second metal is silver.

In some embodiments, the first electrode plates within each first electrode ring assembly are disposed substantially parallel to each other, and the second electrode plates within each second electrode ring assembly are disposed substantially parallel to each other.

In some embodiments, the first electrode plates of the first electrode ring assemblies are disposed at an angle ranging from about 0 to about 180 degrees relative to the second electrode plates of the second electrode ring assemblies.

BRIEF DESCRIPTION OF THE DRAWINGS

Advantages of the invention are apparent by reference to the figures, wherein elements are not to scale so as to more clearly show the details, wherein like reference numbers indicate like elements throughout the several views, and wherein.

DETAILED DESCRIPTION

FIGS. 1-4 depict various components of an ion generation module 10 suitable for generating copper and silver ions in a waste water stream flowing through the module when a voltage is applied across copper and silver electrodes as described in U.S. Pat. Nos. 7,794,606 and 7,799,234. Preferred embodiments of the various components of the ion generation module 10 are described in more detail hereinafter.

Figure 1:
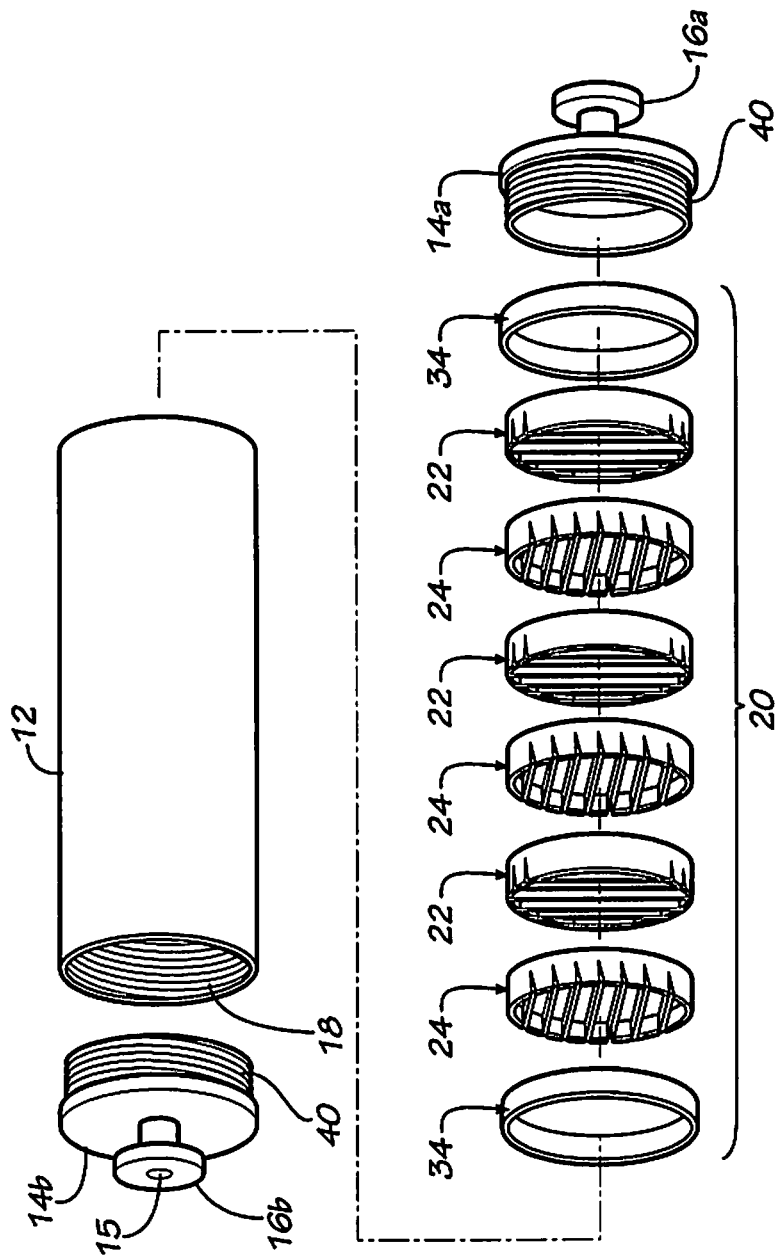
FIG. 1 depicts an exploded view of an apparatus for generating metal ions according to a preferred embodiment.

The exploded view of FIG. 1 depicts an embodiment of a cylindrical housing 12 having inlet and outlet end caps 14a-14b with flanges 16a-16b configured for inline attachment in a continuous-flow fluid waste treatment system. In one embodiment, the housing 12 is formed of stainless steel, but in other embodiments the housing 12 may be formed of other non-corrosive metals, extruded plastic such as PVC, thermoformed plastics, blow-molded plastics, fiberglass-reinforced plastics, and the like. The housing 12 preferably has interior threaded portions 18 at each end which are configured to receive outer threaded portions 40 of the end caps 14a-14b. Alternatively, the end caps 14a-14b may be welded or adhesively bonded to the housing 12, as appropriate to the materials selected. Each end cap 14a-14b includes an aperture 15 in the flange 16a-16b that serves as either an inlet port or outlet port, depending on the orientation of the module 10 with respect to the fluid flow direction.

Figure 2A:
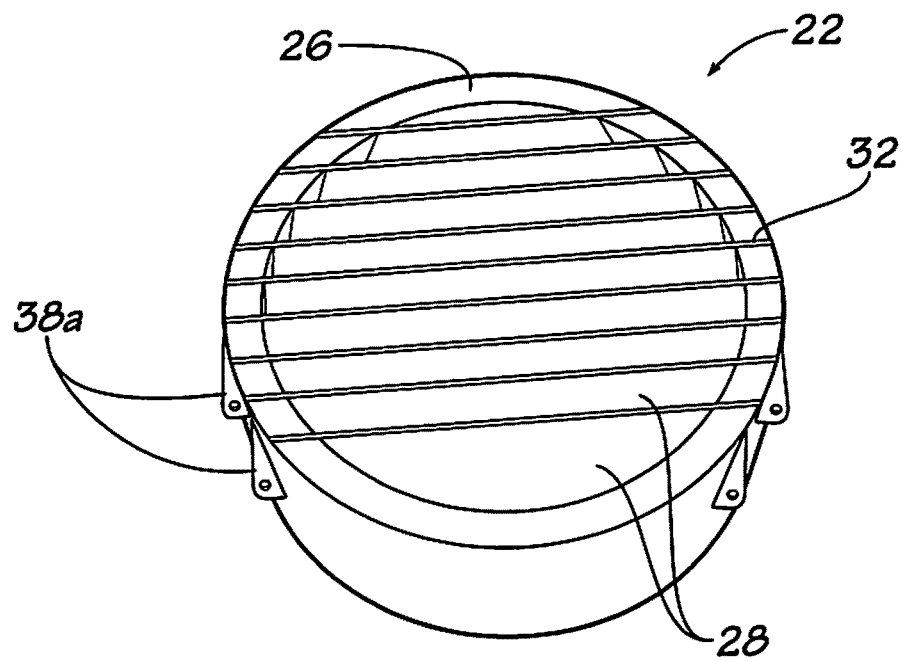
FIG. 2A depicts a copper electrode ring assembly comprising copper electrodes according to a preferred embodiment.
Figure 2B:
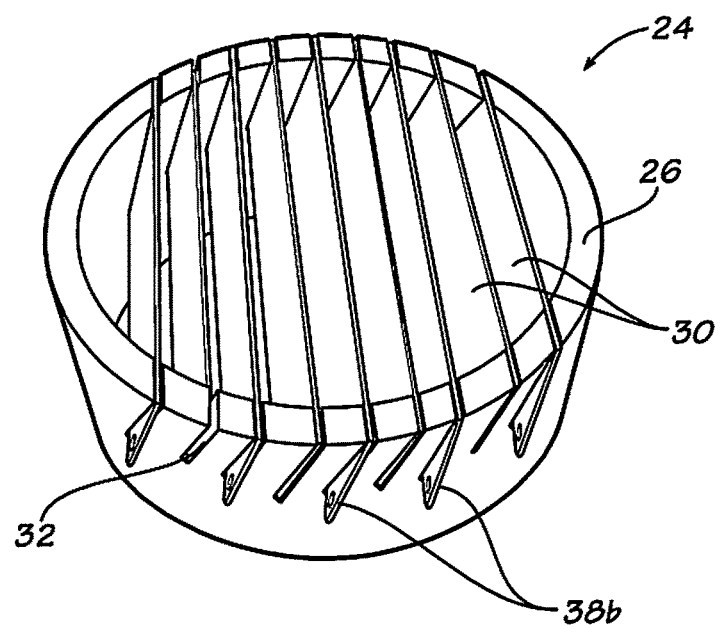
FIG. 2B depicts a silver electrode ring assembly comprising silver electrodes according to a preferred embodiment.
Figure 3:
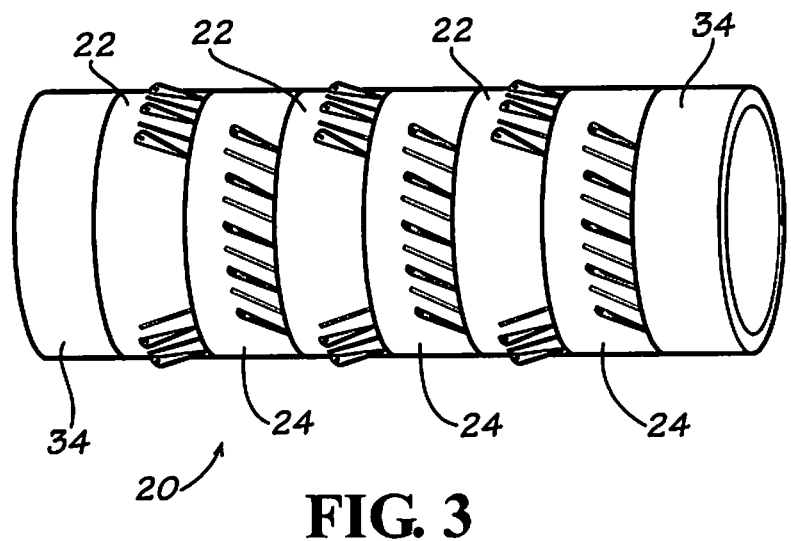
FIG. 3 depicts a side perspective view of an electrode assembly of an ion generation module according to a preferred embodiment.
Figure 4:
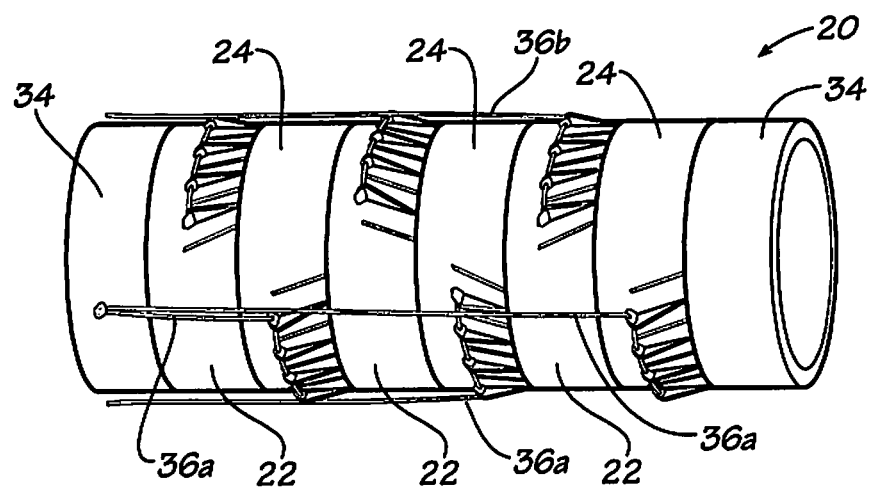
FIG. 4 depicts a side perspective view of an electrode assembly of an ion generation module with a wiring harness according to a preferred embodiment.

Disposed within the cylindrical housing 12 is an electrode assembly 20 as depicted in FIGS. 3 and 4. In a preferred embodiment, the electrode assembly 20 comprises a stack of copper electrode ring assemblies 22 alternating with silver electrode ring assemblies 24. As shown in FIGS. 2A and 2B, each electrode ring assembly 22 and 24 comprises a cylindrical plastic ring 26 having pairs of parallel slots 32 cut into one end on opposing sides of the ring 26. In the embodiment depicted in the figures, the rings are cut from PVC pipe stock. Each slot 32 is preferably cut into the ring 26 at an angle of about 22.5 degrees, and is parallel to each other slot 32. In the copper electrode ring assemblies 22, each pair of opposing slots 32 receives a copper electrode plate 28 that spans the interior opening of the ring 26. In the silver electrode ring assemblies 24, each pair of opposing slots 32 receives a silver electrode plate 30 that spans the interior opening of the ring 26. As shown in FIGS. 2A and 2B, one end of each electrode plate 28 and 30 has a connection tab 38a-38b protruding from the outside surface of the ring 26. The other end of each electrode plate 28 and 30 is preferably embedded in the ring 26 and does not extend past the outside surface thereof. Preferably, the tabs 38a-38b extend from every other electrode on each side of the ring in an alternating fashion.

In a preferred embodiment, optional end rings 34 are disposed at each end of the assembly 20. These end rings 34 are essentially "blanks" having no electrodes. The optional end rings 34 may be used to electrically isolate the electrode ring assemblies 24 and 26 from the housing 12.

In some embodiments, each copper electrode ring assembly 22 includes only copper electrode plates 28, and each silver electrode ring assembly 24 includes only silver electrode plates 30. In alternative embodiments, each electrode ring assembly includes both copper and silver electrode plates, with the copper electrode plates disposed adjacent each other in one half of the ring, and the silver electrode plates disposed adjacent each other in the other half of the ring. In other alternative embodiments, each electrode ring assembly comprises alternating copper and silver electrode plates.

When a voltage is applied between adjacent electrode plates that are immersed in a fluid waste stream flowing through the module 10, metal ions are released from the plates. As described in U.S. Pat. Nos. 7,794,606 and 7,799,234, these metal ions go into solution in the waste stream and destroy bacterial, protist, fungal, and viral infectious agents present therein.

FIG. 4 depicts an embodiment of the electrode assembly 20 to which a wiring harness has been attached to apply the voltage between adjacent electrode plates. The wiring harness includes a first set of wires 36a that are electrically connected, such as by soldering, to the tabs 38a of the silver electrode plates 30, and a second set of wires 36b that are electrically connected to the tabs 38b of the copper electrode plates 28. To provide a voltage between adjacent silver electrode plates 30 within a silver electrode ring assembly 24, the voltage is applied across the pair of wires 36a connected to the tabs 38a on opposing sides of the assembly 24. To provide a voltage between adjacent copper electrode plates 28 within a copper electrode ring assembly 22, the voltage is applied across the pair of wires 36b connected to the tabs 38b on opposing sides of the assembly 22. The wiring harness comprising the first and second set of wires 36a-36b preferably passes through an aperture in the housing 12 or in one of the end caps 14a-14b.

Figure 5:
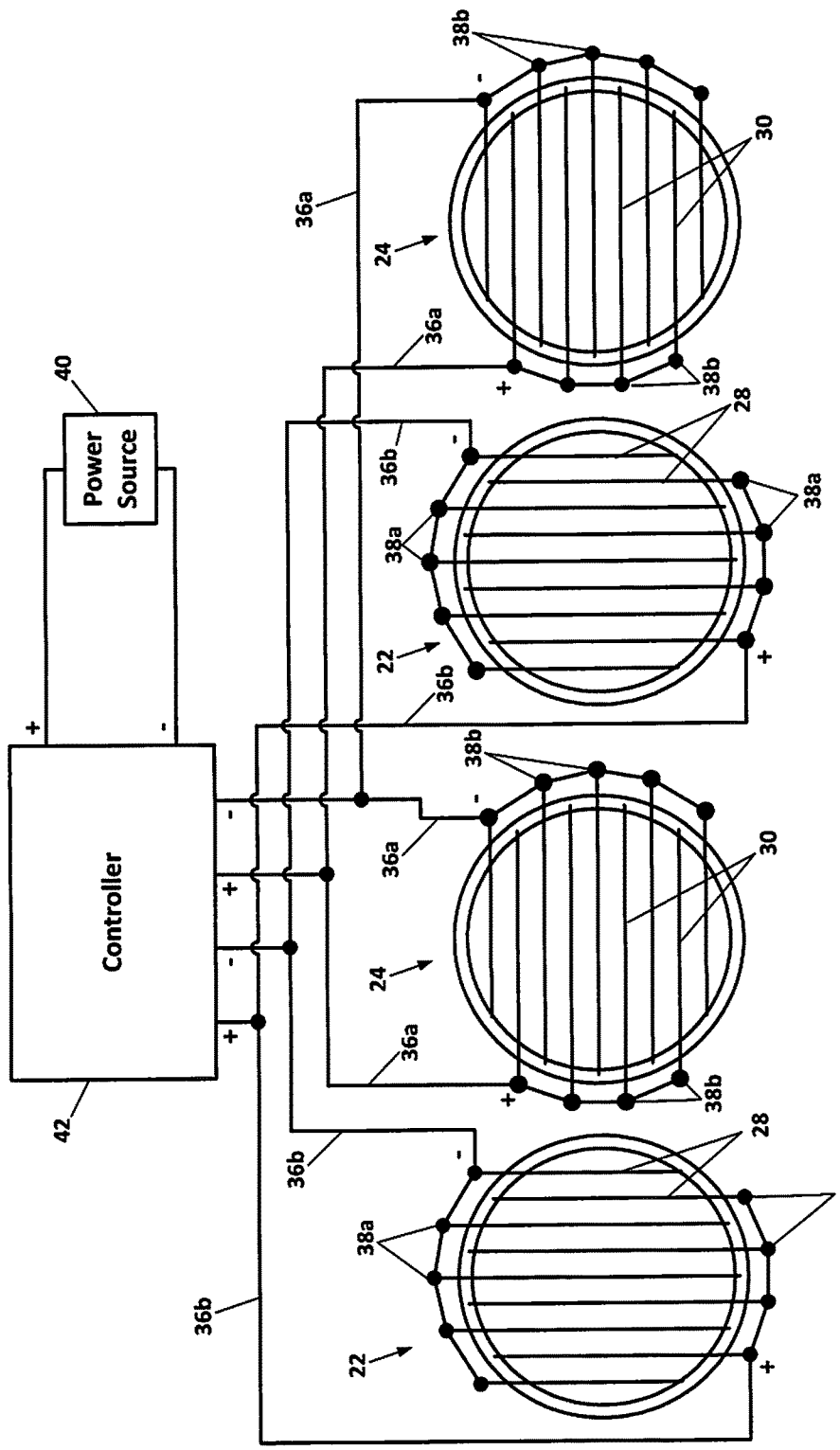
FIG. 5 depicts an electrical schematic of an apparatus for generating metal ions according to a preferred embodiment.

In a preferred embodiment depicted in FIG. 5, the wires 36a-36b connect to a power controller circuit 42 and power source 40 as described in U.S. Pat. Nos. 7,794,606 and 7,799,234. The power source preferably provides a DC voltage of between about 1 and 24 volts, the specific value of which may be determined based on fluid flow rate through the ion generation module 10 and based on the level of contamination of the fluid stream. The controller 42 of this embodiment controls the on/off state and voltage level on the copper electrode ring assemblies 22 independently of the on/off state and voltage level on the silver electrode ring assemblies 24. Although FIG. 5 depicts only four electrode ring assemblies 22 and 24 so as to minimize the complexity of the diagram, it will be appreciated that the controller 42 could control the voltage on any number of electrode assemblies.

The controller 42 is also programmed to initiate an electrode cleaning cycle during which the polarity of the voltage on the electrodes and the current flow is periodically reversed. This provides for removal of contaminating films from the electrodes plates 28 and 30 without having to remove the electrode assemblies 22 and 24 from the housing 12. Constituent components in the waste stream, such as lipid complexes, have an ionic charge. Due to cationic behavior of the lipid complexes, they tend to agglomerate and form bio-film adherends on the negative electrodes. When the polarity of the electrodes is reversed, these bio-film adherends disassociate with the surface of the negative electrode. Thus, by reversing the polarity of the voltage on the electrodes plates 28 and 30, the surface condition of the electrodes can be maintained for optimum infusion and an ionic equilibrium can be maintained during the waste treatment process. In one preferred embodiment, the controller 42 reverses the polarity on the electrodes plates 28 and 30 at 15 second intervals (15 seconds at regular polarity, followed by 15 seconds in reverse polarity, and so on) to provide for continuous cleaning of the electrodes to prevent loss of electrode functionality due to insulating adherents.

To protect the wiring harness and tabs 38a-38b from exposure to the waste stream, the entire outer surface of the electrode assembly 20 may be completely covered in a water-proof potting compound. Alternatively, or in addition, the outer surface of the electrode assembly 20 may be sealed off from the interior of the electrode assembly 20 to prevent fluid exposure to the outer surface. This may be accomplished with an O-ring or circular flat gasket compressed between the inside surface of each end cap 14a-14b and the outer edge of the adjacent end ring 34 of the electrode assembly 20. The electrode ring assemblies 22 and 24 may be adhesively and/or mechanically joined to form the electrode assembly 20. Likewise, the end rings 34 may be adhesively and/or mechanically joined to the electrode assembly 20.

In a preferred embodiment, the parallel direction of the copper electrode plates 28 of each copper electrode ring assembly 22 is oriented orthogonally with respect to the parallel direction of the silver electrode plates 30 of each silver electrode ring assembly 24 as shown in FIG. 1. In alternative embodiments, other angular orientations between the ring assemblies 22 and 24 may be implemented.

In a preferred embodiment, the direction of the 22.5 degree angular slant of the electrode plates is alternated from one ring assembly to the next within the electrode assembly 20. This arrangement provides for enhanced turbulence within the fluid flowing through the electrode assembly and thus enhanced dispersion of copper and silver ions within the flow. In alternative embodiments, other angular orientations or shapes for the electrodes within the ring assemblies 22 and 24 may be implemented. These could include radial blades, helices, cambered plates or other geometries.

In a preferred embodiment, the angular slant of the electrode plates is 22.5 degree. However, one skilled in the art will appreciate that the electrode plates may be disposed at other slant angles, such as 45 degrees or zero degrees, or in combinations of more than one slant angle to promote mixing by fluidic turbulence.

In a preferred embodiment, each electrode ring assembly 22 and 24 includes nine electrode plates 28 and 30. Other embodiments may include more or fewer electrode plates, the number of which may be selected to provide a higher or lower concentration of metal ions in the fluid stream. Also, the total surface area of the combination of electrode plates 28 and 30 within each electrode ring assembly 22 and 24 may be selected to provide a desired concentration of metal ions.

In a preferred embodiment, the electrode assembly 20 includes three copper electrode ring assemblies 22 and three silver electrode ring assemblies 24. Other embodiments may include more or fewer of each type of electrode ring assembly, the number and order of which may be selected to provide a higher or lower concentration of metal ions in the fluid stream.

Some embodiments of the electrode assembly include one or more iron electrodes for generating iron ions. The iron ions act as a catalyst for a subsequent oxidation stage in a waste treatment system as described in U.S. Pat. Nos. 7,794,606 and 7,799,234.

In a preferred embodiment, the electrode ring assemblies 22 and 24 are cylindrical. In other embodiments, the cross-sectional shape of the electrode ring assemblies 22 and 24 may be oval, elliptical, square, rectangular or any other shape. Thus, the invention is not limited to any particular cross-sectional shape of the electrode ring assemblies 22 and 24.

What is claimed is:

1. An apparatus for providing metal ions to a fluid waste stream, the apparatus comprising:
   a housing having an inlet port through which the fluid waste stream enters the housing and an outlet port through which the fluid waste stream exits the housing; and
   an electrode assembly disposed within the housing and between the inlet port and outlet port, the electrode assembly comprising:
      one or more first electrode assemblies, each comprising:
         a first tubular section formed of electrically insulative material and having one or more pairs of opposing angular slots, the first tubular section having an interior through which flows the fluid waste stream; and
         one or more first electrode plates disposed in the one or more pairs of opposing angular slots in the first tubular section, the one or more first electrode plates spanning a portion of the interior of the first tubular section and contacting the fluid waste stream, the one or more first electrode plates formed at least partially of a first metal; and
      one or more second electrode assemblies, each comprising:
         a second tubular section formed of electrically insulative material and having one or more pairs of opposing angular slots, the second tubular section having an interior through which flows the fluid waste stream; and
         one or more second electrode plates disposed in the one or more pairs of opposing angular slots in the second tubular section, the one or more second electrode plates spanning a portion of the interior of the second tubular section and contacting the fluid waste stream, the one or more second electrode plates formed at least partially of a second metal,
      wherein the interior of each first tubular section of the one or more first electrode assemblies is in fluid communication with the interior of each second tubular section of the one or more second electrode assemblies, and wherein an angular slant of the first and second electrode plates ranges from about 22.5 to about 45 degrees relative to a flow direction through the housing.

2. The apparatus of claim 1 wherein the one or more first electrode assemblies are interdigitated with the one or more second electrode assemblies.

3. The apparatus of claim 1 wherein the first metal is copper and the second metal is silver.

4. The apparatus of claim 1 wherein the first electrode plates within each first electrode assembly comprise two or more first electrode plates that are disposed substantially parallel to each other, and the second electrode plates within each second electrode assembly comprise two or more second electrode plates that are disposed substantially parallel to each other.

5. The apparatus of claim 1 wherein the one or more first electrode plates of the one or more first electrode assemblies are disposed substantially perpendicular to the one or more second electrode plates of the one or more second electrode assemblies.

6. The apparatus of claim 1 wherein the first and second tubular sections are cylindrical.

7. The apparatus of claim 1 further comprising:
   a power source for providing electrical voltage to the one or more first electrode assemblies and the one or more second electrode assemblies; and
   a controller circuit connected to the one or more first electrode assemblies and one or more second electrode assemblies, the controller circuit operable to control the electrical voltage applied to the one or more first electrode plates and the one or more second electrode plates.

8. The apparatus of claim 7 wherein the controller circuit is operable to control the electrical voltage applied to the one or more first electrode plates independently of the electrical voltage applied to the one or more second electrode plates.

9. The apparatus of claim 7 wherein the controller circuit is operable to reverse polarity of the electrical voltage applied to the first and second electrode plates in order to clean the first and second electrode plates.

10. The apparatus of claim 7 wherein the controller circuit is operable to control voltage level and time duration of electrical voltage pulses applied to the first and second electrode plates.

11. An apparatus for providing metal ions to a fluid waste stream, the apparatus comprising:
   a housing having an inlet port through which the fluid waste stream enters the housing and an outlet port through which the fluid waste stream exits the housing; and
   an electrode assembly disposed within the housing and between the inlet port and outlet port, the electrode assembly comprising:
      one or more copper electrode ring assemblies, each comprising:
         a first cylindrical section formed of electrically insulative material, the first cylindrical section having an interior through which flows the fluid waste stream and angular slots therein; and
         a plurality of copper electrode plates which span at least a portion of the interior of the first cylindrical section and contact the fluid waste stream, wherein the copper electrode plates within each copper electrode ring assembly are disposed substantially parallel to each other in the angular slots at an angle ranging from about 22.5 to about 45 degrees relative to a flow direction through the first cylindrical section; and
      one or more silver electrode ring assemblies interdigitated with the one or more copper electrode ring assemblies, each of the one or more silver electrode ring assemblies comprising:
         a second cylindrical section formed of electrically insulative material, the second cylindrical section having an interior through which flows the fluid waste stream and angular slots therein; and
         a plurality of silver electrode plates which span at least a portion of the interior of the second cylindrical section and contact the fluid waste stream, wherein the silver electrode plates within each silver electrode ring assembly are disposed substantially parallel to each other in the angular slots at an angle ranging from about 22.5 to about 45 degrees relative to a flow direction through the second cylindrical section and are substantially perpendicular to the copper electrode plates of the one or more copper electrode ring assemblies, wherein the interiors of the one or more first cylindrical sections of the one or more copper electrode ring assemblies are in fluid communication with the interiors of the one or more second cylindrical sections of the one or more silver electrode ring assemblies.

12. An apparatus for providing metal ions to a fluid waste stream, the apparatus comprising:
 a housing having an inlet port through which the fluid waste stream enters the housing and an outlet port through which the fluid waste stream exits the housing, wherein the fluid waste stream flows in a fluid flow direction from the inlet port to the outlet port; and
 one or more electrode assemblies disposed within the housing and between the inlet port and outlet port, each of the one or more electrode assemblies comprising:
  a tubular section formed of electrically insulative material and having an interior area through which flows the fluid waste stream and angular slots therein;
  one or more first electrode plates disposed in the angular slots, each first electrode plate having a width and a length that is greater than the width, each spanning a first portion of the interior of the tubular section and contacting the fluid waste stream, each disposed with its length substantially perpendicular to the fluid flow direction, the one or more first electrode plates formed at least partially of a first metal; and
  one or more second electrode plates disposed in the angular slots, each having a width and a length that is greater than the width, each spanning a second portion of the interior of the tubular section and contacting the fluid waste stream, each disposed with its length substantially perpendicular to the fluid flow direction, the one or more second electrode plates formed at least partially of a second metal,
  wherein an angular slant of the first and second electrode plates ranges from about 22.5 to about 45 degrees relative to a flow direction through the housing.

13. The apparatus of claim 12 wherein the first metal is copper and the second metal is silver.

14. The apparatus of claim 12 wherein the first electrode plates comprise two or more first electrode plates that are disposed substantially parallel to each other, and the second electrode plates comprise two or more second electrode plates that are disposed substantially parallel to each other.

15. The apparatus of claim 12 wherein the one or more first electrode plates are disposed substantially perpendicular to the one or more second electrode plates.

16. The apparatus of claim 12 wherein the tubular section is cylindrical.

17. The apparatus of claim 12 wherein the first and second portions of the interior of the tubular section each comprise about half of the interior of the tubular section.

* * * * *